(12) United States Patent
Voegtlin

(10) Patent No.: US 6,183,124 B1
(45) Date of Patent: Feb. 6, 2001

(54) TILTABLE KNEADING TROUGH FOR THE INDUSTRIAL PRODUCTION OF DOUGH FOR BAKING BREAD, VIENNESE BAKERY PRODUCTS, AND PASTRIES

(75) Inventor: Renè Voegtlin, Oberhausbergen (FR)

(73) Assignee: Mecatherm, Schirmeck (FR)

( * ) Notice: Under 35 U.S.C. 154(b), the term of this patent shall be extended for 0 days.

(21) Appl. No.: 09/367,118
(22) PCT Filed: Feb. 19, 1998
(86) PCT No.: PCT/FR98/00318
 § 371 Date: Aug. 10, 1999
 § 102(e) Date: Aug. 10, 1999
(87) PCT Pub. No.: WO98/37766
 PCT Pub. Date: Sep. 3, 1998

(30) Foreign Application Priority Data

Feb. 25, 1997 (FR) .................................. 97 02466

(51) Int. Cl.[7] .................................................. A21C 1/06
(52) U.S. Cl. ............................... 366/91; 366/92; 366/99; 366/185
(58) Field of Search ............................... 366/45, 46, 76.9, 366/77, 91–99, 138, 185, 187, 189, 194, 141, 219

(56) References Cited

U.S. PATENT DOCUMENTS

| | | | |
|---|---|---|---|
| 2,073,652 | * | 3/1937 | Robb . |
| 2,174,089 | * | 9/1939 | Johnson . |
| 2,199,289 | * | 4/1940 | Johnson . |
| 2,238,343 | * | 4/1941 | Rybeck et al. . |
| 4,459,028 | * | 7/1984 | Bruder et al. ........................ 366/141 |
| 5,599,099 | * | 2/1997 | Bullivant .............................. 366/141 |
| 5,758,962 | * | 6/1998 | Ismar ..................................... 366/97 |

FOREIGN PATENT DOCUMENTS

| | | |
|---|---|---|
| 29 674 | 1/1885 | (DE) . |
| 0 457 495 | 11/1991 | (EP) . |
| 244 194 | 1/1926 | (GB) . |

* cited by examiner

*Primary Examiner*—Charles E. Cooley
(74) *Attorney, Agent, or Firm*—Harrison & Egbert

(57) ABSTRACT

A kneading trough for the industrial production of dough for baking bread, Viennese bakery products, pastry or the like, designed to supply a processing unit, such as a dough divider (6) having one or several vats (2, 2A) provided with a kneading mechanism (3) and a mechanism for measuring out (4) ingredients to supply the vat(s) (2, 2A) at each kneading cycle. This kneading trough (1) includes the vat(s) (2, 2A) which are are mounted tilting on a supporting frame (10) located above the dough-processing unit (6), and, furthermore, the mechanism for measuring out (4) ingredients (I1, I2, I3, I4, I5) is mounted on the supporting frame (10) above the vat(s) (2, 2A).

14 Claims, 2 Drawing Sheets

TILTABLE KNEADING TROUGH FOR THE INDUSTRIAL PRODUCTION OF DOUGH FOR BAKING BREAD, VIENNESE BAKERY PRODUCTS, AND PASTRIES

BACKGROUND OF THE INVENTION (1) Field of the Invention

The invention relates to a kneading trough for the industrial production of dough for baking bread, Viennese bakery products, and pastries, designed to supply a processing unit, such as a dough divider, comprising, on the one hand, one or several vats provided with kneading means and, on the other hand, means for measuring out the ingredients to supply the vat or vats at each kneading cycle.

The present invention concerns the field of equipment for the industrial bakery.

(2) Description of the Prior Art

Nowadays, there are mainly two types of units for kneading dough for mass production of baking bread, Viennese bakery products and pastries. One ensures a production that can be qualified as discontinuous, whereas the other one leads to a continuous production of dough. Clearly said, while, in the first case, there are several kneading troughs in which a determined amount of dough will be produced at each kneading cycle, in the second case the unit constantly receives, from one side, ingredients, such as flour, water, salt and/or the like, and continuously delivers the dough from its opposite end.

Actually, the solution which consists in discontinuously producing dough is the most common one and makes use of several kneading troughs the vats of which are moved in a closed circuit in order to successively pass under means for supplying previously measured-out ingredients, then under kneading means, before being conveyed to the dough-processing unit, e.g. a dough divider. At that moment, the vats must be raised above the supply funnel such a divider is usually provided with. Upon emptying, these vats repeat the cycle from the beginning. Such installations are usually called dough-production roundabouts, whereby their installation can be done either on a ring or on a line. In the first case the vats move along a circular path, whereas in the second case these vats move in front of filling, kneading and emptying units arranged in a line. Installations combining simultaneously both solutions have also been devised.

It is clear from the above description that such roundabout-like installations require a very large floor area and the lifting of the vats to pour their contents into the dough divider. Raised means for supplying and measuring out the ingredients must also be available in order to successively supply these vats at each kneading cycle.

Therefore, in addition to a large floor-area requirement, there is a height requirement with these kind of installations.

Finally, the latter are of a very complex design, especially because of the means to be implemented for conveying the various vats in a closed circuit. The risks of failing are therefore high. It is necessary to proceed to many maintenance inspections to avoid the production breakdowns.

In the case of a continuously operating kneading trough, there is usually a vat with a horizontal axis inside which intervene one or several small tools for mixing the ingredients, then at progressively ensuring the kneading of the dough.

The main drawback resulting from this kind of continuously operating kneading trough is at the level of the transition periods that should be kept at each start and at the end of the production. During these transition phases and, generally, as long as the kneading trough is not at full load, the dough supplied is indeed not of a constant quality. Therefore, no production is possible during these phases, which of course results into a drop in the profitability of the installation. For the same reasons, an installation provided with a continuously operating kneading trough does not allow instantaneously transition to another recipe of produced dough. It is therefore inflexible in use.

In addition, it raises the problem of the continuous measuring out of the ingredients, which is less accurate than the measuring out per vat load.

Furthermore, though it is less space-requiring than a roundabout-like installation with multiple kneading troughs and vats, the continuous kneading trough still requires a very substantial floor area, especially if one wants it to be capable of meeting high production rates.

SUMMARY OF THE INVENTION

Thus, the present invention solves the drawbacks of both the roundabout-like installations and the continuous kneading troughs.

To this end, the present invention relates to a kneading trough for the industrial production of dough for baking bread, Viennese bakery products and pastries designed to supply a processing unit, such as a dough divider, comprising one or several vats provided with kneading means and means for measuring out the ingredients to supply the vat or vats at each kneading cycle. The vat or vats are mounted tilting on a supporting frame located above the dough-processing unit. On this supporting frame is mounted, above the vat or vats, the means for measuring out the ingredients.

According to a peculiar feature of the present invention, the vat or vats are of a cylindrical type with a horizontal axis and are distributed on the periphery of the upper edge of a supply funnel of the dough-processing unit.

The advantages resulting from the present invention reside in that the kneading trough requires only a small floor area, since it can be placed directly above a dough divider. In this respect, taking into consideration the usual dimensions of such a dough divider, there can be an installation in which the horizontal axis of the kneading trough with a cylindrical general shape is located approximately at human height, so that there remains enough room for arranging the means for measuring out the ingredients in the space under the ceiling of the rooms currently used in an industrial bakery.

Moreover, the vats of this kneading trough according to the invention remain at their same location during the various phases of filling with ingredients, kneading and emptying into the supply funnel of the dough divider. This eliminates the complexity of the above-described roundabout-like installations' mechanics.

Other aims and advantages of the present invention will clearly appear during the following description that refers to an embodiment that is given only by way of an indicative and non-limiting example.

The understanding of this description will be made easier with reference to the attached drawings.

DETAILED DESCRIPTION OF THE PREFERRED EMBODIMENTS

Figure 1:
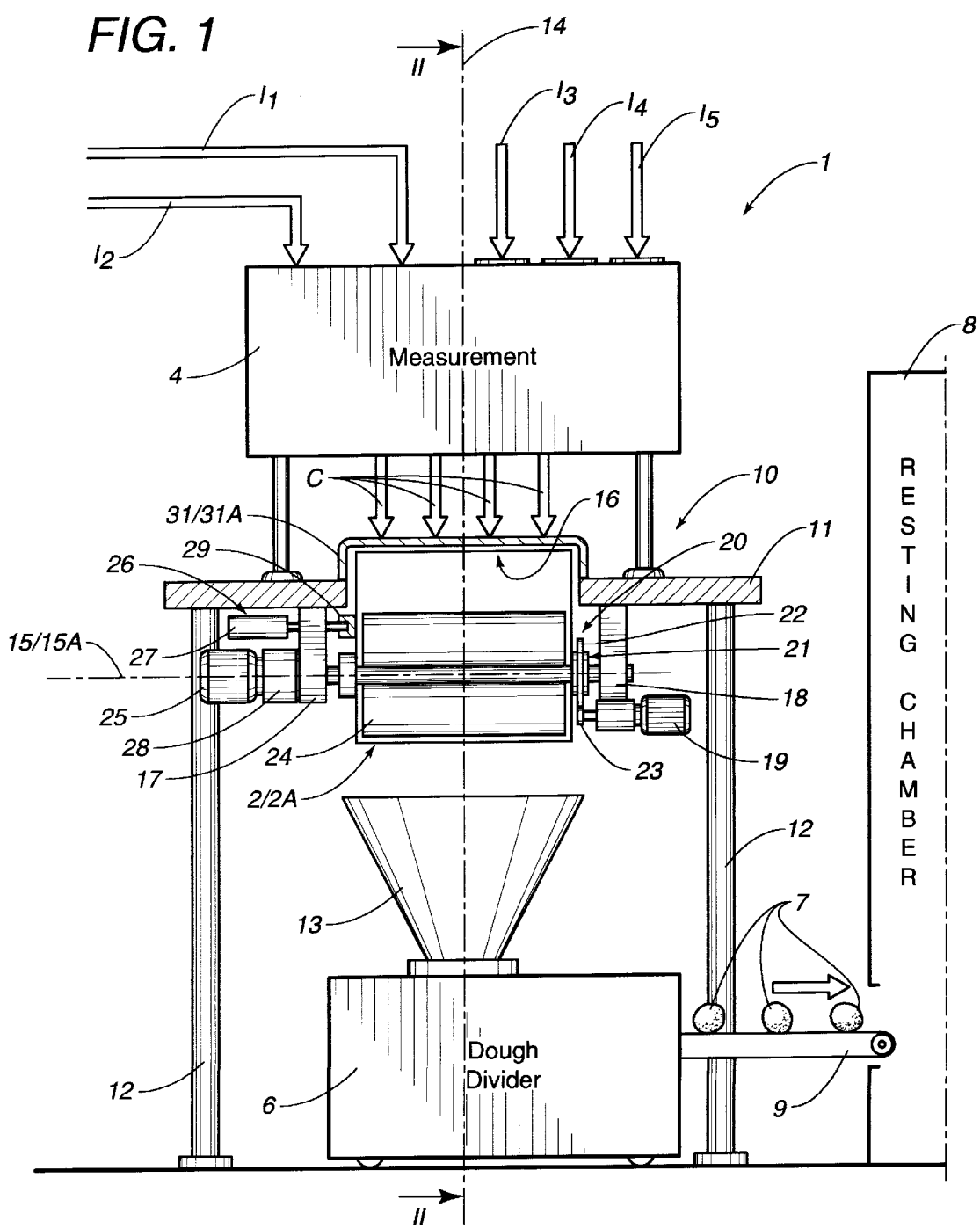
FIG. 1 is a schematic elevation and partly cross-sectional view of the kneading trough according to the invention.
Figure 2:
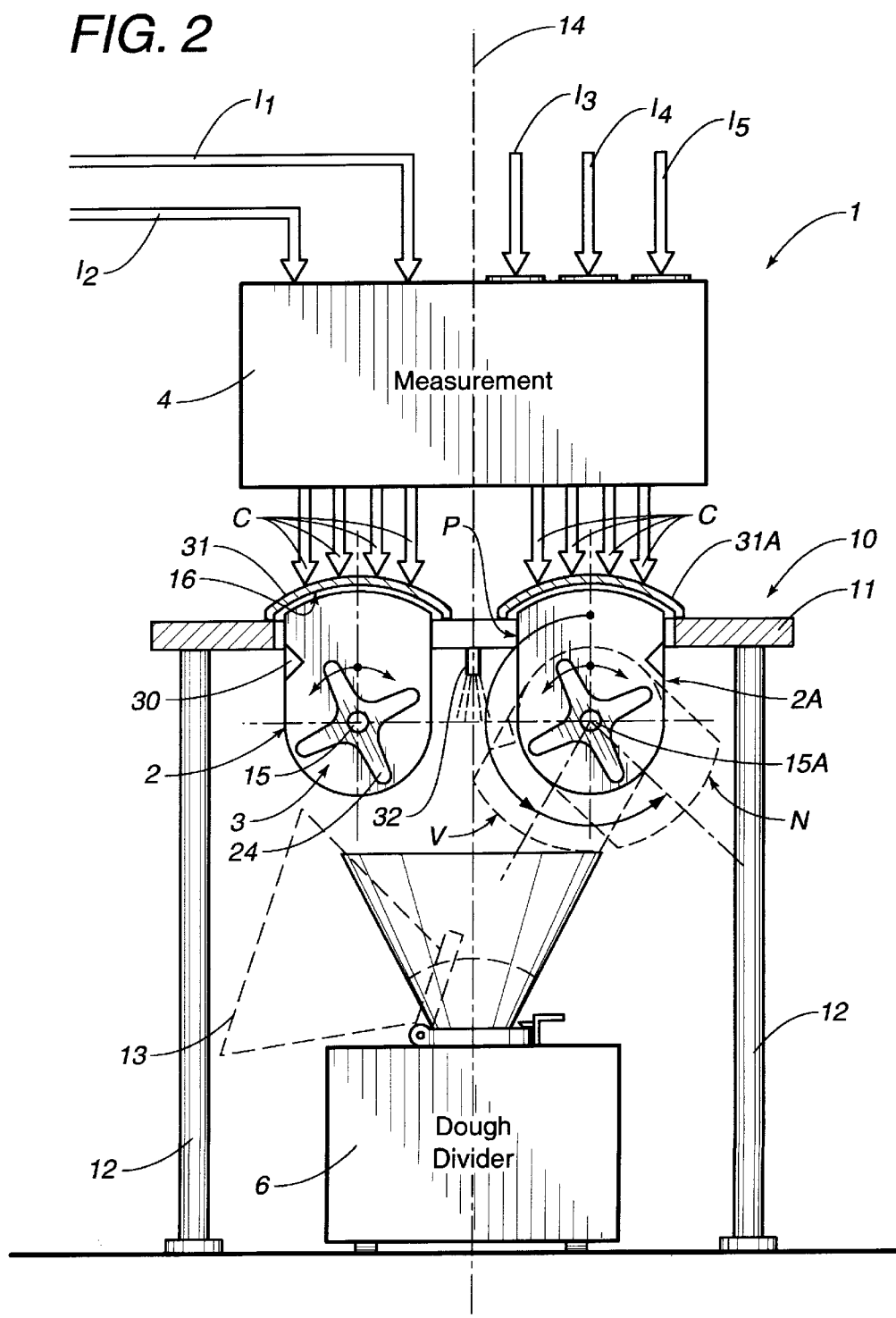
FIG. 2 is a schematic and partly cross-sectional view according to II—II of FIG. 1.

As shown in FIGS. 1 and 2 of the attached drawings, the present invention relates in particular to a kneading trough 1 designed for the industrial production of dough for baking bread, Viennese bakery products and pastries.

Such a kneading trough 1 includes at least one vat 2 provided with kneading means 3. Actually, in the embodiment shown in the figures and described hereinafter, this kneading trough 1 includes two vats 2, 2A, but could as well include more of them, as this will clearly appear from the following description.

It is also provided with means 4 for measuring out the ingredients I1, I2, I3, I4, I5 for successively supplying the vats 2, 2A at each kneading cycle.

Finally, this kneading trough 1 includes means for delivering the dough after it has been kneaded, from a vat 2, 2A into a processing unit, e.g. in the shape of a dough divider 6 which, as can be seen in FIG. 1, divides the dough into uniform dough pieces 7. These dough pieces 7 are then conveyed towards a processing unit, such as a resting chamber 8, this through a conveyor 9.

In fact, according to the invention, the vats 2, 2A are mounted tiltably on a supporting frame 10 located above said dough divider 6. On this supporting frame 10 is mounted, above these vats 2, 2A, the means 4 for measuring out the ingredients.

Thus, according to a preferred embodiment, this supporting frame 10 is characterized by a platform 11 supporting the load of the vats 2, 2A and supported by poles 12, preferably four in number, distributed at the periphery of the divider 6. One should note in this regard, that above this dough divider 6 is advantageously mounted a supply funnel 13 arranged under said platform 11, preferably along the vertical median axis 14 of the kneading trough 1.

As regards the vats 2, 2A themselves, as stated above, their number may vary and will finally depend on the production rate looked for. Actually, when several vats are available, they are evenly distributed above and around this supply funnel 13 of the dough divider 6.

According to a preferred embodiment, such a vat 2, 2A has a cylindrical shape with a horizontal axis 15, 15A and includes flat side walls. In addition, it includes, in its upper portion 16, an opening neck that enables it to receive the various ingredients, and also to pour the dough, after it has been kneaded, into the supply funnel 13. This opening neck is turned upwards in the kneading position P of the vat 2, 2A, as shown in plain lines in FIG. 2. It is important to note that this vat 2, 2A can also be brought, through tilting about its horizontal axis 15, 15A, into an emptying position V and, should the case arise, into a cleaning position N. The last two positions have been shown in broken lines in FIG. 2.

Thus, such a vat 2, 2A is supported, on both sides, by bearing blocks 17, 18 integral with the platform 11. Electric driving means 19 are capable of controlling the tilting of that vat 2, 2A, through proper driving means 20. In particular, at one end 21 of the tilting axis 15, 15A of the vat 2, 2A can be mounted a crown wheel 22 with which engages a toothed wheel 23 which is controlled in rotation by the driving means 19. Further embodiments can be contemplated as regards the driving means 20, such as a pulley and driving belt system.

As far as the kneading means 3 are concerned, they are advantageously in the form of a rotor with blades 24 with a horizontal axis of rotation. The axis 15, 15A of the vat 2, 2A, thus the tilting axis of the latter, and the rotation axis of the rotor with blades 24 preferably coincide. As regards the driving of this rotor with blades 24, it is also achieved through a electric engine 25, such as a variable-speed motor with reversible direction of rotation. This allows adjusting the parameters to the various stages of processing of the dough including a smoothing operation prior to the actual kneading process. The latter is indeed conducted at a more constant speed of the rotor with blades 24 and in a direction of rotation opposite the one used during the smoothing.

In particular, during the kneading of the dough, the vat 2, 2A must compulsorily be kept immobile with respect to its tilting axis 15, 15A, this in its position P. Therefore, means 26 for locking the rotation of this vat 2, 2A are available, e.g. in the form of one or several jacks 27 fixed to the supporting frame 10, viz. on one and/or the other bearing block 17, 18, and the control rod 28 of which co-operates, in locking position, with a retaining sleeve 29 integral with the vat 2, 2A.

The latter can receive further equipment designed to improve the kneading of the dough. In particular, it can be provided with one or several inserts 30 on the inner wall against which this rotor with blades 24 will have a tendency to beat the dough during the kneading operation. Moreover, for some kinds of dough, the kneading must compulsorily be conducted under controlled-temperature conditions. A vat 2, 2A can therefore be with controlled temperature. Such a vat can be designed with a double wall authorizing the circulation of a medium at controlled temperature, such as a cooling medium.

Finally, as can be seen in FIGS. 1 and 2, the platform 11 is advantageously provided with fixed covers 31, 31A closing the opening neck of the vats 2, 2A when these are raised, i.e. in their kneading position.

These covers 31, 31 A are provided for holes through which occurs the supplying of the vats 2, 2A with the ingredients I1, I2, I3, I4, I5 proceeding from the measuring-out means 4. These preferably correspond to apparatus available on the market, their configuration depending on the kind of ingredients to be measured out.

By way of an example, the measuring out of flour occurs through weighing. In particular, on the supporting frame 10 can be mounted, through balances, a weighing cradle supporting a funnel capable of containing the necessary flour for one kneading cycle. Thus, at the beginning of the cycle this funnel is supplied with flour, by means of an adequate pump, this until it is detected, through the balances, that the desired quantity of flour has been reached in the funnel. On that same weighing cradle can be mounted a tank for containing water to be added to the dough. Thus, assuming the operations for filling with flour and water are performed successively, each of these ingredients can be accurately measured out.

Depending on the implemented recipes, the temperature of the water can be controlled.

For some ingredients used in smaller amounts, such as improving agents, salt, yeast and the like, the measuring-out means 4 can be in the form of several ingredient reserves mounted on the supporting frame 10 from which a measure is taken at each kneading cycle, by means that are also known to the specialist. Such secondary ingredients can be controlled so that their addition to the dough occurs only during the kneading and at well-determined times, depending on the implemented recipe.

The ingredients are preferably conveyed by gravity from the measuring-out means 4 into the vats 2, 2A. In addition, at the level of the connections of the measuring-out means 4 to the fixed cover 31, 31A of each vat 2, 2A should be made a distinction at least between the dry products and those products such as water, fat and the like, in order to avoid the progressive clogging of the various connecting conduits.

Turning back now to the operating cycle of the kneading trough 1, one should note it is indirectly controlled by the production rate of the processing unit, in this case, the dough divider 6. In this regard, the kneading trough 1 can be provided with a sensor 32, e.g. of an optical type, capable of detecting the level of the dough inside the divider 6.

More exactly, this funnel 13 is systematically supplied by a vat 2, 2A that has arrived at the end of a kneading cycle, as soon as the dough level is lower than a threshold value detected by the sensor 32. In this respect, the kneading cycles themselves are conducted at such a rate that the rate of the divider 6 can be met and thus that a given quantity of kneaded dough can be available when so required by the latter.

On the other hand, the means for controlling the operation of the kneading trough 1 act so that the measuring-out means 4 are at any time capable of supplying one of the vats 2, 2A with a measure of ingredients.

As already stated above, the number of vats 2, 2A depends on the production rate to be met. These vats 2, 2A are distributed above the supply funnel 13 of the divider 6, which preferably has a polygonal shape, in order to have, with respect to each vat 2, 2A, a side parallel to the axis 15, 15A of the latter. This results into a better filling, without overflow, of this supply funnel 13.

In order to make the interventions by an operator easier, such as for cleaning, this supply funnel 13 can also be mounted tiltably on the divider 6, through connecting means 33 as shown in FIG. 2.

The vats 2, 2A are also capable of being brought into a cleaning position N, in which, as can be seen in FIG. 2, their opening neck is oriented downwards and outwardly with respect to the supporting frame 10. Such an arrangement makes the access to the rotor with blades 24 indeed easier.

Such a kneading trough 1 can also be provided with other accessories that are known in the field. In particular, it can be provided with means for lubricating the walls of the supply funnel 13 of the dough divider 6, in order to make the flowing out of the dough easier.

The advantages resulting from the present invention, as clearly appears from the preceding description, reside in that the kneading trough 1 for the industrial production of dough is arranged in height and, in addition, directly above the dough-processing unit, so that the floor area it requires is reduced to a minimum. Accordingly, from this point of view, the present invention provides a real solution to the problems associated with the current discontinuously operating kneading troughs. At the same time, the kneading trough 1 as described above does not have the drawbacks of a continuously operating kneading trough which does not allow any flexibility in production. Within the framework of this kneading trough 1, it is indeed possible to instantaneously change the recipe to transition from the production of a given product to another.

The present invention therefore represents a clear progress in the field in question.

I claim:

1. A kneading trough apparatus for the mass production of dough products comprising:

a supporting frame;

a vat mounted tiltably on said supporting frame;

kneading means positioned within said vat for kneading dough ingredients within said vat;

a dough processing means positioned below said vat, said dough processing means for dividing or shaping the kneaded dough ingredients as passed from said vat; and ingredient supply means positioned above said vat, said ingredient supply means for measuring out the dough ingredients and passing the dough ingredients into said vat.

2. The apparatus of claim 1, said supporting frame comprising:

a platform supporting said vat thereon; and a plurality of poles connected to said platform so as to support said platform at an elevated position, said plurality of poles arranged around a periphery of said dough processing means.

3. The apparatus of claim 2, further comprising:

a supply funnel mounted on said dough processing means, said supply funnel positioned below said platform.

4. The apparatus of claim 3, said vat comprising a plurality of vats evenly distributed above and around said supply funnel, said supply funnel having a polygonal shape.

5. The apparatus of claim 4, said vat being tiltable about a horizontal axis between a kneading position and an emptying position, said emptying position for allowing said vat to pour the kneaded dough ingredients into said supply funnel, said vat being movable to a cleaning positioning such that said vat opens downwardly and outwardly relative to said supporting frame.

6. The apparatus of claim 5, further comprising:

electric driving means connected to said vat for selectively moving said vat to one of said kneading position and said emptying position and said cleaning position.

7. The apparatus of claim 5, further comprising:

locking means interconnected to said vat for locking said vat in said kneading position.

8. The apparatus of claim 7, said locking means comprising:

a jack affixed to said supporting frame, said jack having a control rod cooperative with a retaining sleeve affixed to said vat.

9. The apparatus of claim 8, said locking means further comprising:

a bearing block integral with said platform, said bearing block supporting said vat on said platform.

10. The apparatus of claim 2, said platform having a fixed cover covering an opening neck of said vat when said vat is in a kneading position, said fixed cover having holes through which the dough ingredients are passed by said ingredient supply means.

11. The apparatus of claim 10, future comprising:

a plurality of conduits extending from said ingredient supply means and connected over said holes on said fixed cover.

12. The apparatus of claim 1, said vat having a generally cylindrical configuration with a horizontal axis, said vat having an opening neck at an upper portion thereof, said opening neck suitable for receiving said dough ingredients from said ingredient supply means, said opening neck suitable for pouring the kneaded dough ingredients into said dough processing means.

13. The apparatus of claim 1, said kneading means comprising:

a rotor with blades having a horizontal axis of rotation, said horizontal axis of rotation aligned with a horizontal axis about which said vat is tiltable; and an electric engine drivably connected to said rotor.

14. The apparatus of claim 13, said electric engine being of variable speed with a reversible direction of rotation.

\* \* \* \* \*